United States Patent
Berzin

(10) Patent No.: US 8,254,320 B2
(45) Date of Patent: Aug. 28, 2012

(54) MOBILITY MANAGEMENT USING ADDRESS POOLS IN MOBILITY LABEL BASED MPLS NETWORKS

(75) Inventor: Oleg L. Berzin, Huntingdon Valley, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 559 days.

(21) Appl. No.: 12/346,007

(22) Filed: Dec. 30, 2008

(65) Prior Publication Data

US 2010/0165929 A1 Jul. 1, 2010

(51) Int. Cl.
*H04W 4/00* (2009.01)
*H04L 12/28* (2006.01)
*H04L 12/56* (2006.01)

(52) U.S. Cl. ......... 370/329; 370/328; 370/389; 370/392

(58) Field of Classification Search .................. None
See application file for complete search history.

(56) References Cited

U.S. PATENT DOCUMENTS

| | | | |
|---|---|---|---|
| 7,929,557 B2 * | 4/2011 | Kompella | 370/401 |
| 2006/0002324 A1 | 1/2006 | Babbar et al. | |
| 2006/0159095 A1 | 7/2006 | Cook et al. | |
| 2007/0076732 A1 * | 4/2007 | Kim | 370/409 |

* cited by examiner

*Primary Examiner* — Faruk Hamza
*Assistant Examiner* — Diane Lo

(57) ABSTRACT

A routing system coupled to a label switching network receives a pool of network addresses allocated to a mobility region in the network, where the pool of network addresses includes a sequence of contiguous network addresses. The routing system stores the pool of network addresses, and allocates a range of mobility labels to the network address pool for use in communicating with mobile nodes in the mobility region.

22 Claims, 13 Drawing Sheets

MOBILITY MANAGEMENT USING ADDRESS POOLS IN MOBILITY LABEL BASED MPLS NETWORKS

BACKGROUND

Multi-Protocol Label Switching (MPLS) is a data-carrying protocol that may be used in packet-switched computer or telecommunications networks. MPLS may be used to carry many different types of traffic, including, for example, Internet Protocol (IP) packets, ATM cells, SONET frames, and Ethernet frames. MPLS involves prefixing packets with an MPLS header that contains one or more "labels called a "label stack." Each label stack entry may contain a label value, a Quality of Service (QoS) field that indicates the QoS requirements for the packet, a "bottom of stack" flag that indicates the last label in the stack, and a time to live (TTL) field. When a packet with an MPLS header is received at a router, it is switched after a label look-up instead of a lookup into an IP table.

Entry and exit points of an MPLS network are called Label Edge Routers (LER). Ingress LERs push the MPLS label onto the incoming packet and the egress LER pops the MPLS label off the outgoing packet. When an unlabeled packet enters an ingress LER, the ingress LER inserts one or more labels in the packet's newly created MPLS header. The packet may then be passed on to the next hop router for the MPLS tunnel. When a labeled packet is received by an MPLS router, the topmost label is examined. Based on the contents of the label, a swap, push or pop operation can be performed on the packet's label stack. The routers use lookup tables to determine which kind of operation to perform based on the topmost label of the incoming packet. In a swap operation, the label is swapped with a new label, and the packet is forwarded along the path associated with the new label. In a push operation, a new label is pushed on top of the existing label, effectively "encapsulating" the packet in another layer of MPLS. This permits hierarchical routing of MPLS packets. In a pop operation, the label is removed from the packet, which may reveal an inner label below (i.e., the packet is "decapsulated"). If the popped label was the last label in the label stack, the packet leaves the MPLS tunnel. At the egress LER, when the last label has been popped, only the payload remains. This can be an IP packet, or any of a number of other kinds of payloads.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Systems and methods described herein implement network addressing and traffic management schemes based on Regional Address Pools (RAPs) that operate within a mobility label based MPLS network. Use of RAPs, as described herein, permits network addresses (e.g., IP addresses) to be allocated for use by respective routers in the mobility label based MPLS network for assigning to mobile nodes served by those respective routers. As described herein, all of the RAPs allocated within a network may fall within an overall mobility address range allocated by the network service provider for mobility management functions. Each RAP may form a contiguous network address range that does not overlap with other RAP address ranges in the mobility label based network. Based on the allocated RAPs, each router in the network may generate a corresponding Mobility Pool Label Range (MPLR) which includes multiple Mobility Pool Labels (MPLs), with each MPL of the MPLR corresponding to an individual network address from the RAP. The MPLs may be assigned to mobile nodes that register with the router that maintains a respective RAP to enable MPLS data forwarding (e.g., MPLS tunneling) to the mobile nodes.

Figure 1:
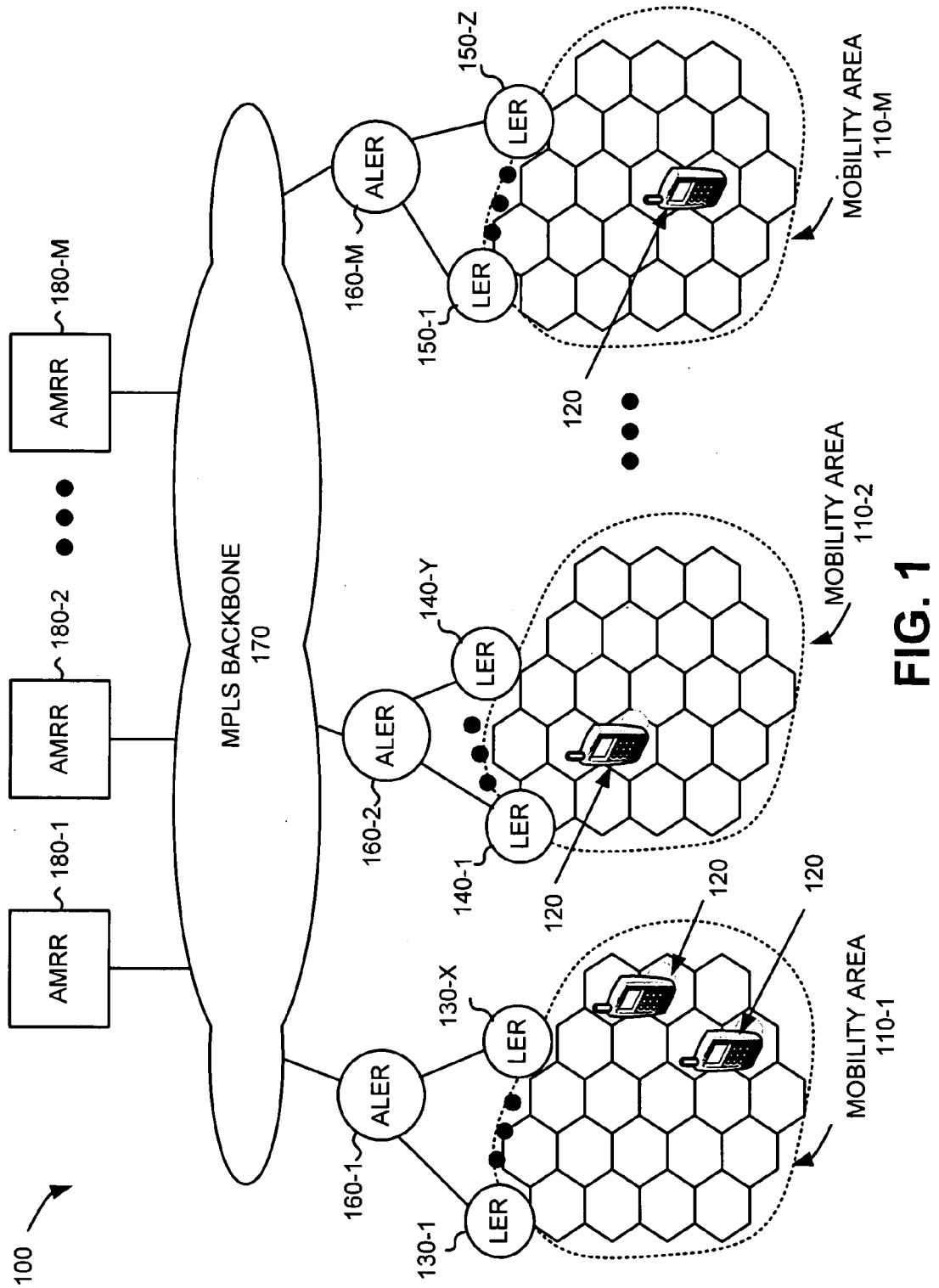
FIG. 1 is a diagram of an exemplary network in which systems and methods described herein may be implemented.

FIG. 1 is a diagram of an exemplary network 100 in which systems and methods described herein may be implemented. As shown, network 100 may include multiple mobility areas 110-1 through 110-M, each of which is associated with respective Label Edge Routers (LERs) (e.g., LERs 130-1 through 130-X, 140-1 through 140-Y, and 150-1 through 150-Z), Area LERs associated with each mobility area (e.g., ALER 160-1 associated with mobility area 110-1, ALER 160-2 associated with mobility area 110-2, ALER 160-M associated with mobility area 110-M, etc.), an MPLS backbone network 170, and multiple area mobility router reflectors (AMRRs) 180-1 through 180-M.

Mobility areas 110-1 through 110-M (hereinafter referred to individually or generically as "mobility area 110") may each include a collection of mobility regions aggregated by a corresponding ALER (e.g., each mobility area 110 aggregated by a different one of ALERs 160-1 through 160-M). Each mobility region in the mobility area may include a collection of Radio Access Network (RAN) cells served by a mobility support function residing in a corresponding LER. Each mobility region may be served a respective LER.

LERs 130-1 through 130-X, 140-1 through 140-Y and 150-1 through 150-Z may include routers that switch incoming data units toward outgoing destinations. LERs 130-1 through 130-X, 140-1 through 140-Y and 150-1 through 150-Z may further perform mobile node registration functions and may maintain and advertise a pool of network addresses allocated for assignment to mobile nodes in their respective mobility regions, as described in further detail below. ALERs 160-1 through 160-M may participate in packet forwarding to/from LERs in network 100, in addition to other functions described further below.

MPLS backbone 170 may include a network for carrying signaling between AMRRs 180-1 through 180-M, and for carrying data traffic between LERs 130-1 through 130-X, 140-1 through 140-Y and 150-1 through 150-Z. AMRRs 180-1 through 180-M may perform control plane (signaling) functions involved in mobility management using regional address pools, as described in further detail below.

Figure 2:
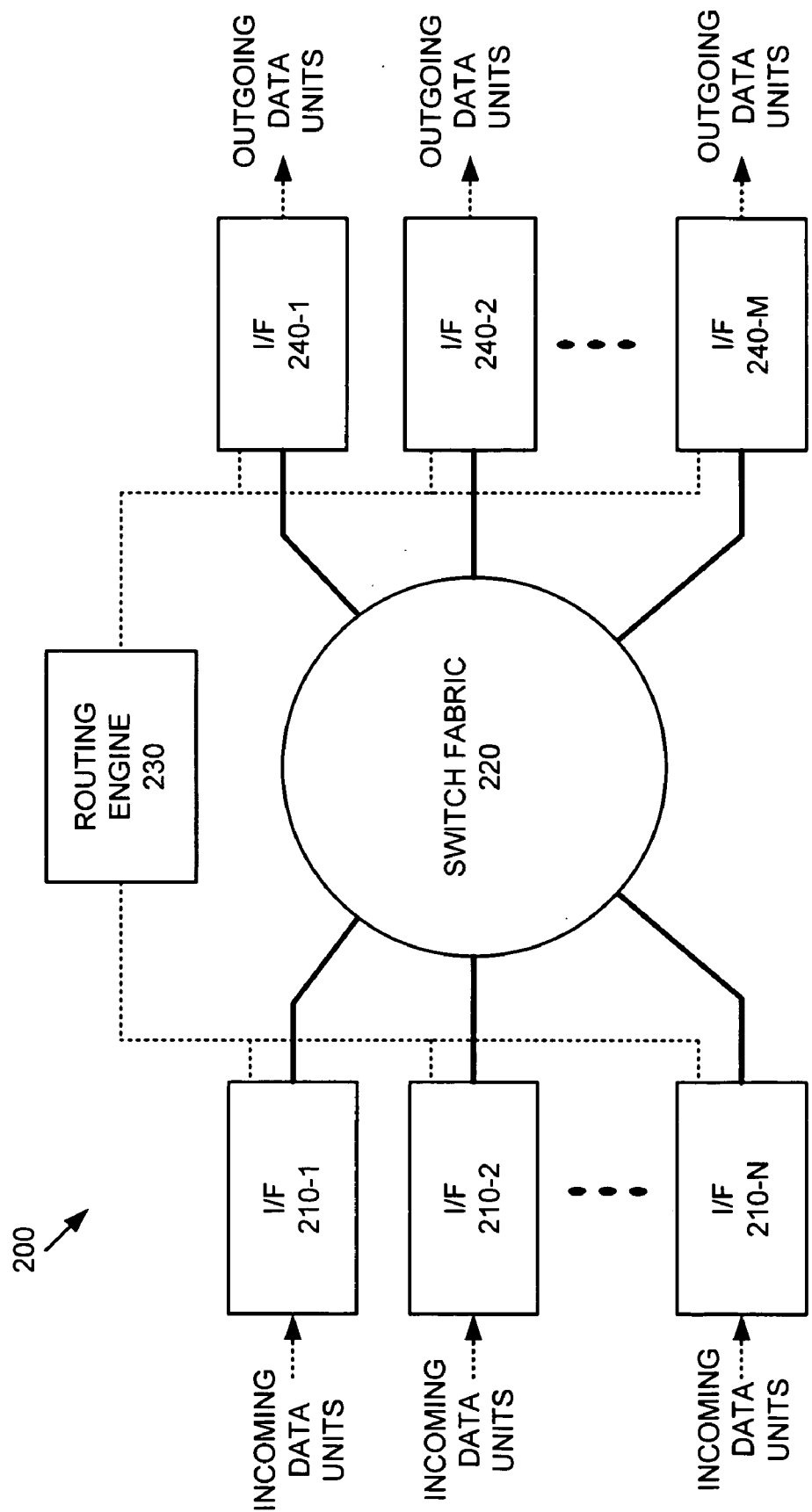
FIG. 2 is a diagram of an exemplary configuration of a router.

FIG. 2 illustrates a configuration of a router 200 that may correspond to LERs 130-1 through 130-X, 140-1 through 140-Y and 150-1 through 150-Z and/or to ALERs 160-1 through 160-M. Router 200 may receive one or more data units from one or more incoming physical links, process the data units to determine destination information, and transmit the data units on one or more outgoing links in accordance with the destination information or one or more other properties of the data units. The data units may include packets, cells, or datagrams; fragments of packets, cells, or datagrams; or other types of data. The one or more incoming physical links and the one or more outgoing links may connect to the external network.

Router 200 may include one or more ingress interfaces 210-1 through 210-N (generically and individually referred to herein as an "ingress interface 210"), a switch fabric 220, a routing engine 230, and one or more egress interfaces 240-1 through 240-M (generically and individually referred to herein as an "egress interface 240"). Each ingress interface 210 may receive incoming data units via one or more physical links and may forward the received data units through switch fabric 220 to a respective egress interface. Each ingress interface 210 may forward received data units to a respective egress interface 240 using, for example, a forwarding information base (FIB) table received from routing engine 230. Routing engine 230 may communicate with other of nodes (e.g., other LERs) connected to router 200 to obtain address pool information that may be used to generate mobility pool labels for MPLS data forwarding. Routing engine 230 may create the FIB table based on the obtained address pool information and may forward the FIB table to each ingress interface 210 and each egress interface 240. Routing engine 230 may also perform other general control and monitoring functions for router 200.

Switch fabric 220 may include one or more switching planes to facilitate communication between ingress interface 210-1 through 210-N and egress interfaces 240-1 through 240-M. In one exemplary implementation, each of the switching planes may include a three-stage switch of crossbar elements. Other types of switching planes may, however, be used in switch fabric 220. Egress interfaces 240-1 through 240-M may receive data units from switch fabric 220 and may forward the data units towards destinations in the network via one or more outgoing physical links.

Router 200 may include fewer, additional and/or different components than are shown in FIG. 2. The interfaces in FIG. 2 have been arbitrarily designated as "ingress interfaces" or "egress interfaces" for purposes of illustration. Each one of interfaces 210-1 through 210-N or 240-1 through 240-M may act as an ingress and/or an egress interface. Thus, each one of interfaces 210-1 through 210-N or 240-1 through 240-M may receive data units from the external network, or forward data units received from switch fabric 220 towards destinations in the external network.

Figure 3A:
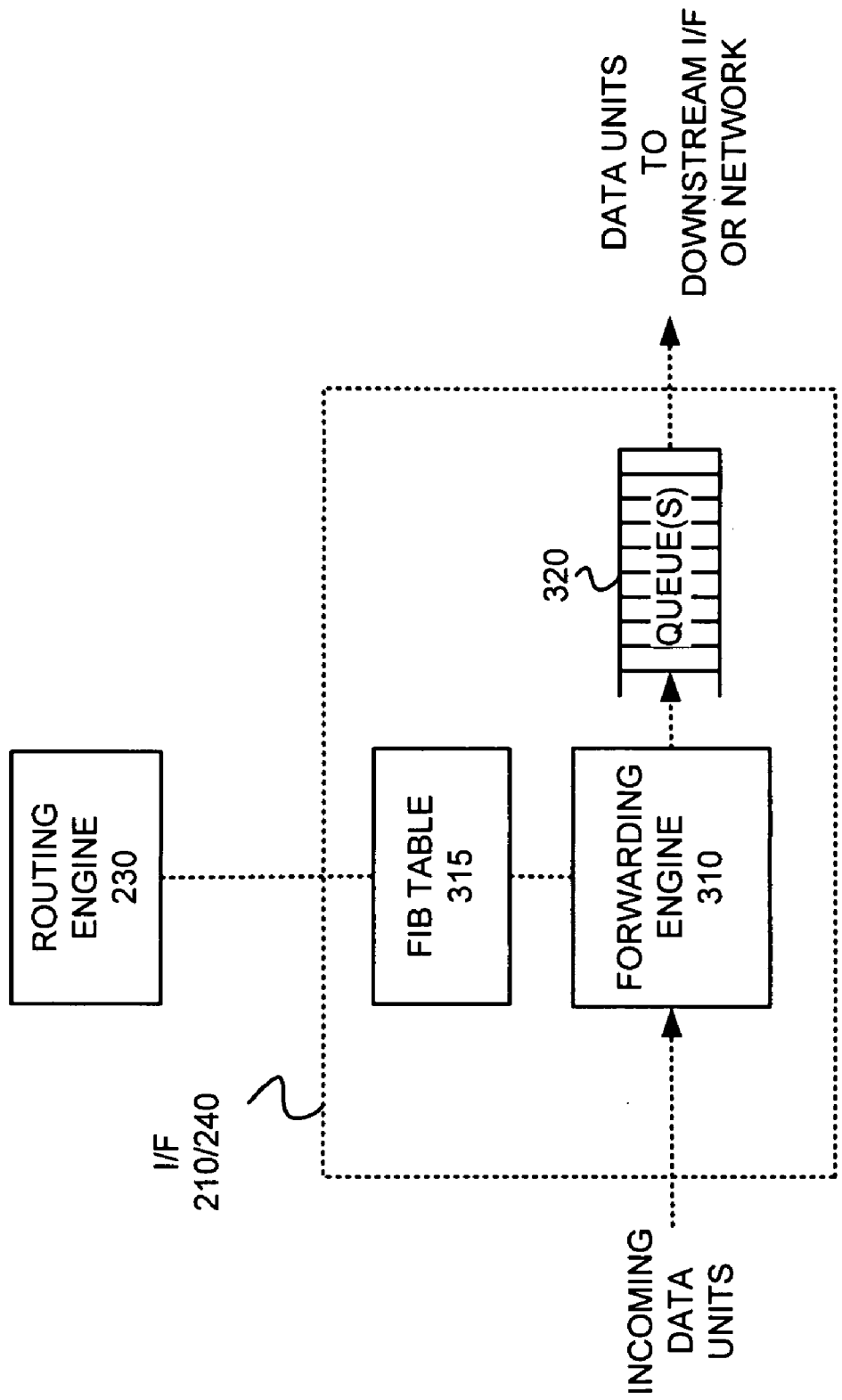
FIG. 3A is a diagram of an interface of the router of FIG. 2 according to an exemplary implementation.

FIG. 3A illustrates exemplary components of an interface 210/240. As shown in FIG. 3A, interface 210/240 may include a forwarding engine 310, a forwarding information base (FIB) table 315, and one or more queues 320. FIG. 3A further depicts routing engine 220 being connected to interface 210/240. Routing engine 220 may supply the contents of FIB 315 to interface 210/240 based on obtained address pool information.

Forwarding engine 310 may receive data units from switch fabric 220, or from a physical link connected to the external network and may inspect one or more properties (e.g., header destination node address) of each data unit, retrieve a label from FIB table 315, and modify the MPLS header of each data unit to forward the data unit to its next hop (e.g., "pop" the retrieved label into the MPLS header). Forwarding engine 310 may then queue each data unit in queue(s) 320. The data units queued in queue(s) 320 may be selectively dequeued and forwarded to a downstream interface 210/240, via switch fabric 220, or to the external network. Interface 210/240 may, in some implementations, include fewer, additional or different components than those shown in FIG. 3A.

Figure 3B:
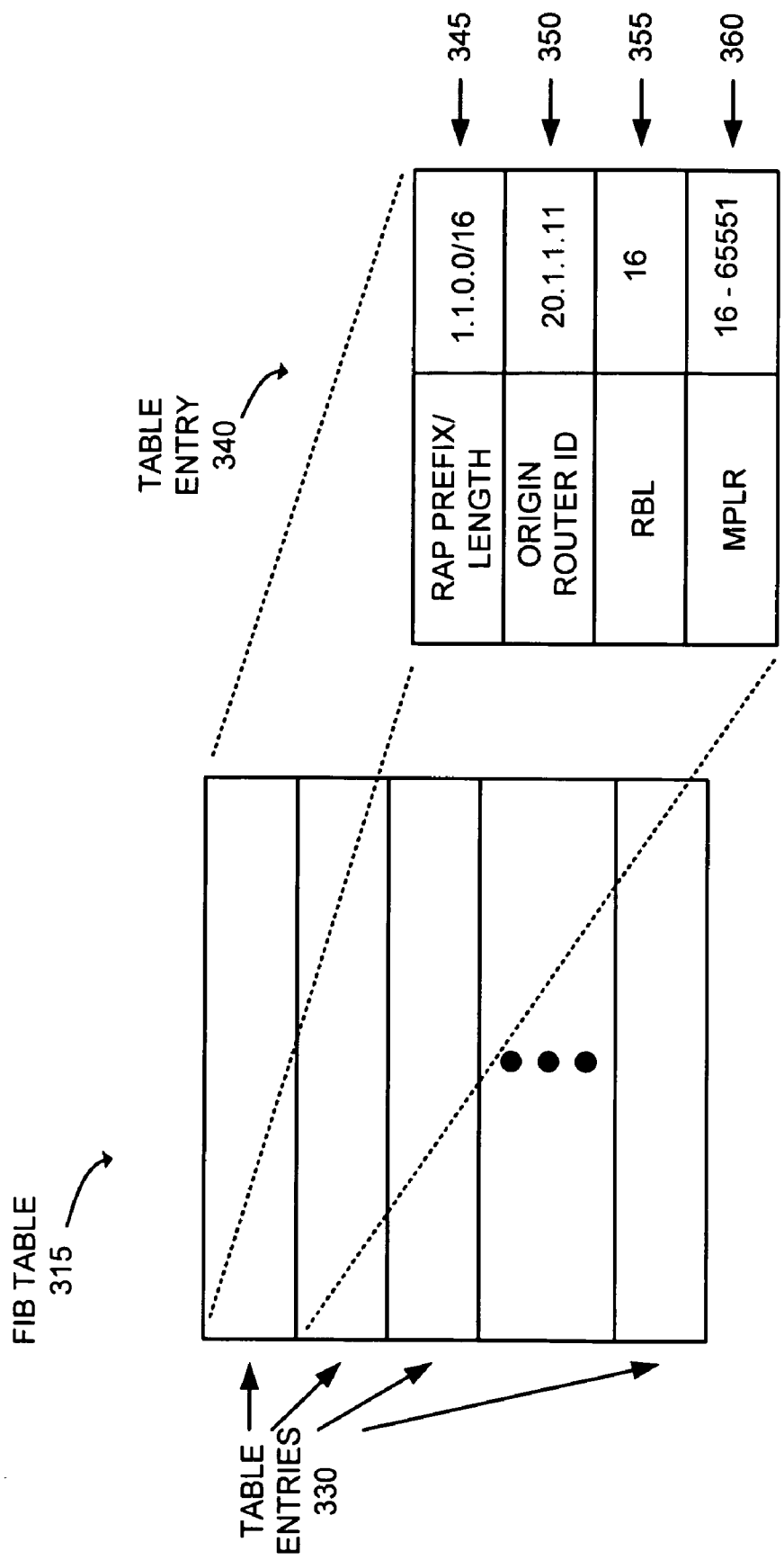
FIG. 3B is a diagram of the forwarding information base table of FIG. 3A according to an exemplary implementation.

FIG. 3B is a diagram of FIB table 315 of FIG. 3A according to an exemplary implementation. As shown, FIB table 315 may include multiple table entries 330, with each entry being associated with a different regional address pool (RAP) in network 100. An exemplary table entry 340 of table entries 330 is further shown in FIG. 3B. Table entry 340 may include a Regional Address Pool (RAP) prefix/length 345, an origin router identifier (ID) 350, a Regional address pool Base Label (RBL) 355 and a Mobility Pool Label Range (MPLR) 360.

RAP prefix/length 345 may identify a given RAP by its starting network address and its length. For example, the RAP may be identified by using the Prefix/Length format that is identical to the IP sub-net. For example, in IPv4, the RAP identified by the prefix/length 1.1.0.0/16 may have the starting IP address of 1.1.0.0, the ending IP address of 1.1.255.255, and may contain 216 (65536) addresses, of which 216−2 are usable (excluding the starting and ending IP addresses). Origin router ID 350 may identify the network of address of the LER at which the RAP identified by RAP prefix/length 345 may be maintained. An example router ID 350 of 20.1.1.11 is depicted in FIG. 3B. RBL 355 may identify the first label in the MPLR. An exemplary RBL 355 of 16 is depicted in FIG. 3B. MPLR 360 may identify the range of MPLs in the RAP. An example MPLR 360 of 16 to 65551 is depicted in FIG. 3B.

Further details regarding the use of RAP prefix/length 345, router ID 350, RBL 355 and MPLR 360 are described below with respect to the exemplary processes of FIGS. 5, 6A-6B, 8 and 9A-9B.

Figure 4:
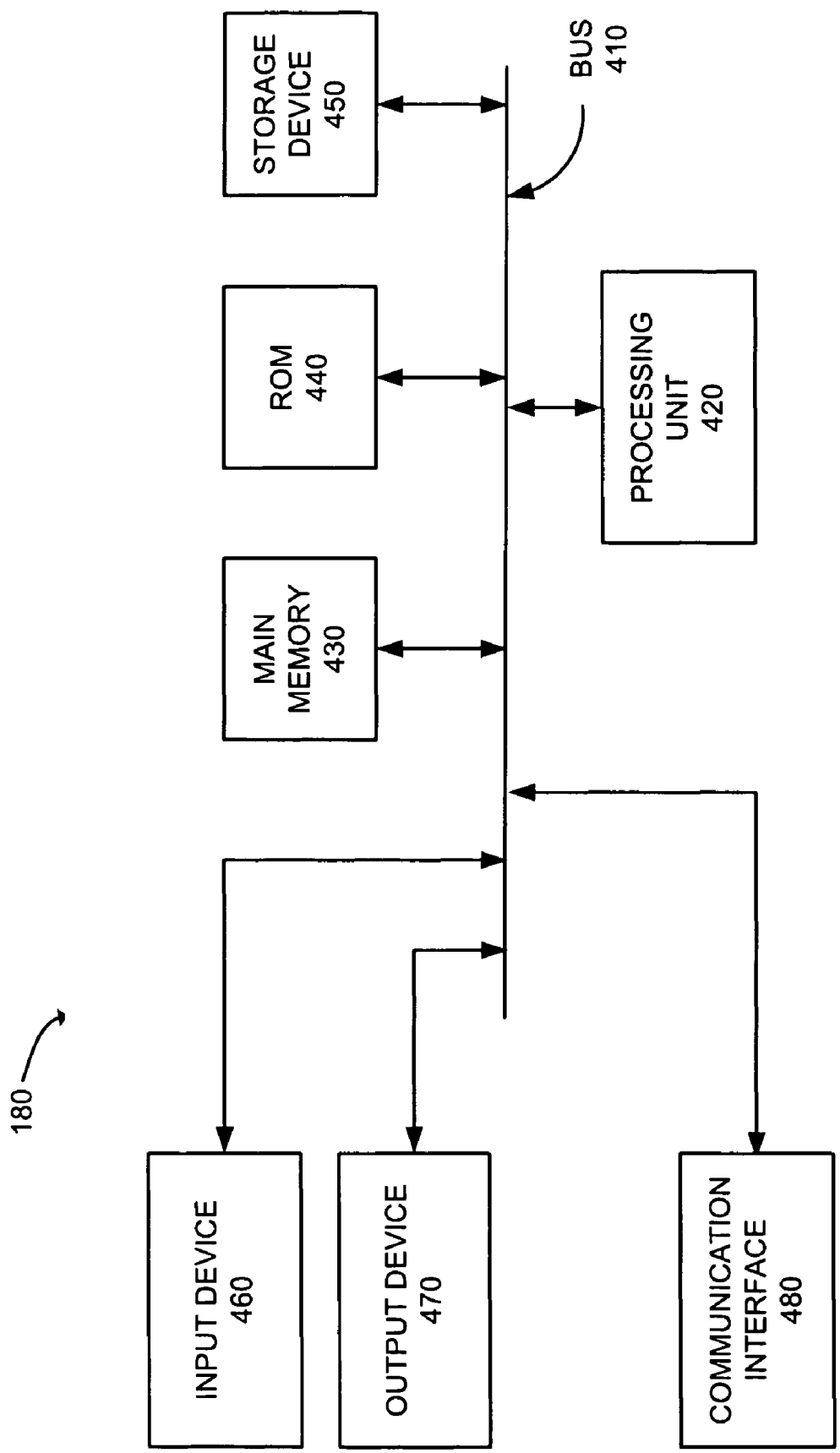
FIG. 4 is a diagram of an exemplary configuration of an area mobility route reflector of FIG. 1.

FIG. 4 is a diagram of AMRR 180 according to an exemplary implementation. AMRR 180 may include a bus 410, a processing unit 420, a main memory 430, a read only memory (ROM) 440, a storage device 450, an input device 460, an output device 470, and a communication interface 480. Bus 410 may include a path that permits communication among the elements of AMRR 180.

Processing unit 420 may include a conventional processor, microprocessor, or processing logic that may interpret and execute instructions. Main memory 430 may include a random access memory (RAM) or another type of dynamic storage device that may store information and instructions for execution by processor 420. ROM 440 may include a ROM device or another type of static storage device that may store static information and instructions for use by processing unit 420. Storage device 450 may include a magnetic and/or optical recording medium and its corresponding drive.

Input device 460 may include a mechanism that permits an operator to input information to AMRR 180, such as a keyboard, a mouse, a pen, voice recognition and/or biometric mechanisms, etc. Output device 470 may include a mechanism that outputs information to the operator, including a display, a printer, a speaker, etc. Communication interface 480 may include any transceiver-like mechanism that enables device 240 to communicate with other devices and/or systems. For example, communication interface 480 may include mechanisms for communicating with another device or system via a network, such as MPLS backbone network 170.

AMRR 180 may perform certain operations or processes described herein. AMRR 180 may perform these operations in response to processing unit 420 executing software instructions contained in a computer-readable medium, such as memory 430. A computer-readable medium may be defined as a physical or logical memory device. Each of main memory 430, ROM 440 and storage device 450 may include computer-readable mediums. The magnetic and/or optical recording mediums (e.g., readable CDs or DVDs) of storage device 450 may also include computer-readable mediums.

The software instructions may be read into memory 430 from another computer-readable medium, such as data storage device 450, or from another device via communication interface 480. The software instructions contained in memory 430 may cause processing unit 420 to perform operations or processes that will be described later. Alternatively, hardwired circuitry may be used in place of or in combination with software instructions to implement processes described herein. Thus, implementations consistent with the principles of the invention are not limited to any specific combination of hardware circuitry and software.

Figure 5:
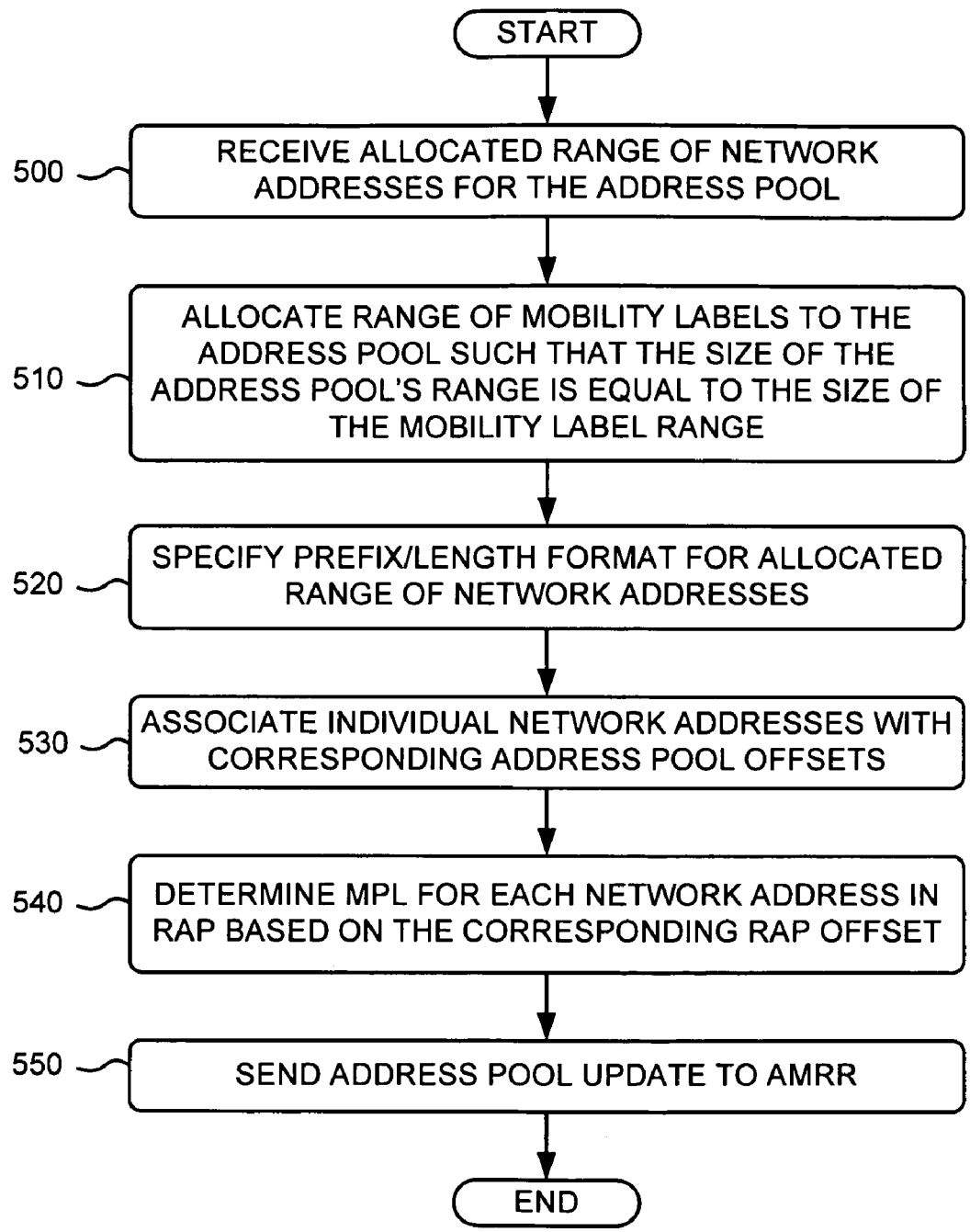
FIG. 5 is a flow diagram that illustrates an exemplary process for allocating a range of network ranges and corresponding mobility labels for an address pool associated with a LER in a mobility label based MPLS network.

FIG. 5 is a flow diagram that illustrates an exemplary process for allocating a range of network addresses and corresponding mobility labels for an address pool associated with a LER in a mobility label based MPLS network. The exemplary process of FIG. 5 may be implemented by LER 130/140/150.

The exemplary process may begin with the receipt of an allocated range of network addresses for a regional address pool (RAP) (block 500). The network service provider may allocate an overall network address range for mobility uses (e.g., for use by mobile nodes), and a sub-range of the overall mobility address range may be allocated to each LER 130/140/150 in network 100. The RAP may form a contiguous address range that does not overlap with other address pool ranges in network 100. In one implementation, the allocated range of networks addresses for the RAP may include a contiguous range of Internet Protocol (IP) addresses.

A range of mobility labels may be allocated to the address pool such that the size of the address pool's range is equal to the size of the mobility label range (block 510). For example, the number of network addresses in the address pool may be equal to the number of individual labels in the associated mobility label range. The mobility label range is referred to herein as the Mobility Pool Label Range (MPLR) and the individual labels are referred to herein as Mobility Pool Labels (MPLs). The first label of the MPLR is referred to herein as the Regional address pool Base Label (RBL). The last label of the MPLR is referred to herein as the Regional address pool End Label (REL).

A prefix/length format may be specified for the allocated range of network addresses (e.g., for the RAP) (block 520). The RAP may be identified by its starting network address and it length. For example, the RAP may be identified by using the prefix/length format that is identical to an IP subnet. For example, in IPv4, the RAP identified by the prefix/length 1.1.0.0/16 may have the starting IP address of 1.1.0.0, the ending IP address of 1.1.255.255, and may contain $2^{16}$ (65536) addresses, of which $2^{16}-2$ are usable (excluding the starting and ending IP addresses).

Individual network addresses of the address pool may be associated with corresponding address pool offsets (block 530). When individual network addresses are allocated from the RAP, they may be associated with a corresponding RAP offset (RO). The RO may include the sequence number of a network address in the RAP starting from the RAP's starting IP address and counting from 0. For example, if an IP address of 1.1.0.21 is allocated from the RAP 1.1.0.0/16, then the RO equals 21.

A mobility pool label may be determined for each network address in the RAP based on the corresponding RAP offset (block 540). Given an RAP's Prefix/Length notation, the RBL and the RO for an individual network address and the individual MPL from the MPLR may be determined for the individual network address. For example, if 1.1.0.21 is allocated from the RAP 1.1.0.0/16 and the RBL=16, then the MPL would equal 16+21=37 for this individual network address. Thus, given the RAP's Prefix/Length notation, the individual network address from the RAP's address range, the address pool's RO and the RAP's RBL, the individual MPL for a given network address (e.g., IP address) may be determined.

Figure 6A:
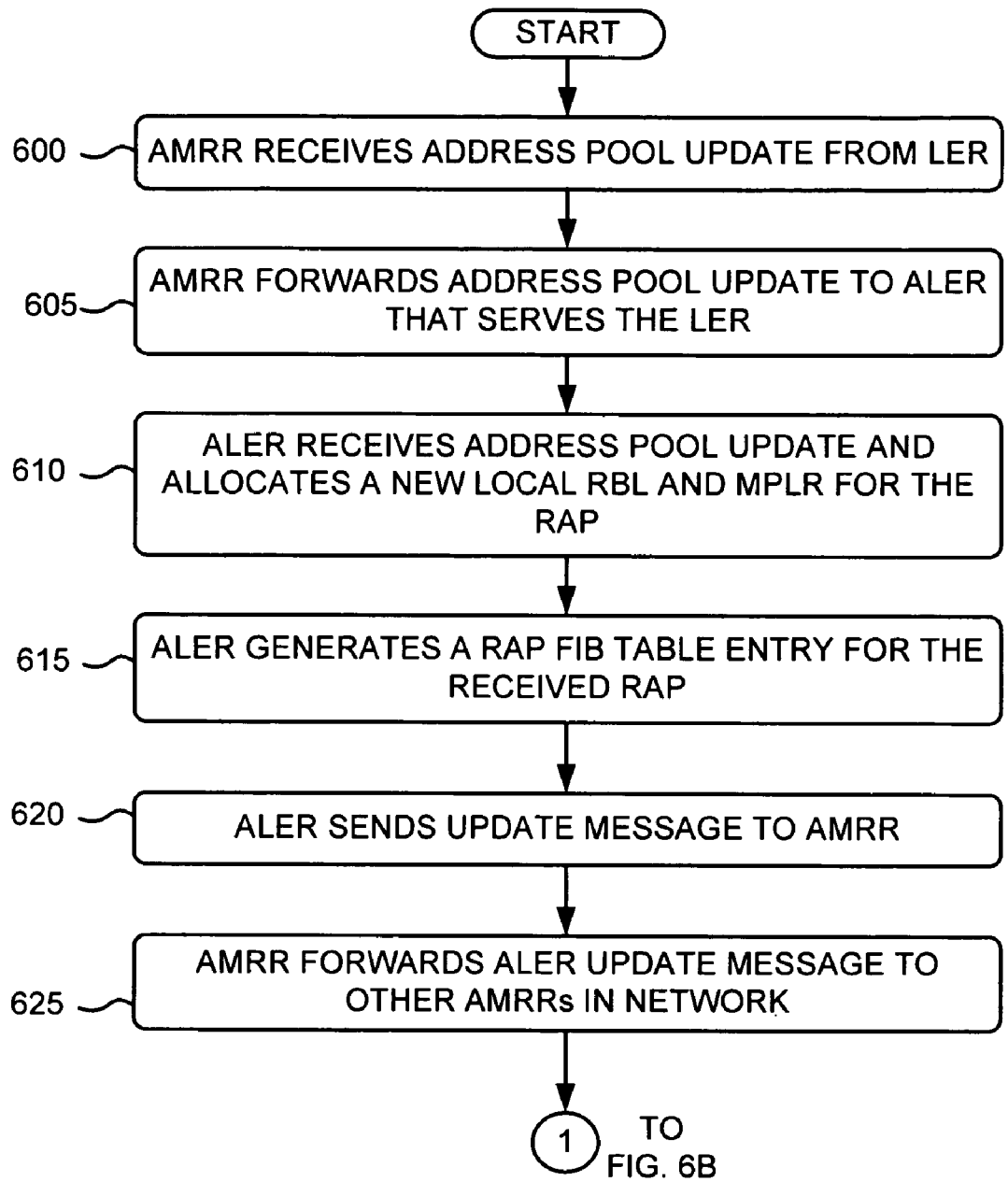
FIGS. 6A and 6B are flow diagram that illustrate an exemplary process for distributing of mobility address pool information to LER and ALER nodes in a mobility label based MPLS network.
Figure 6B:
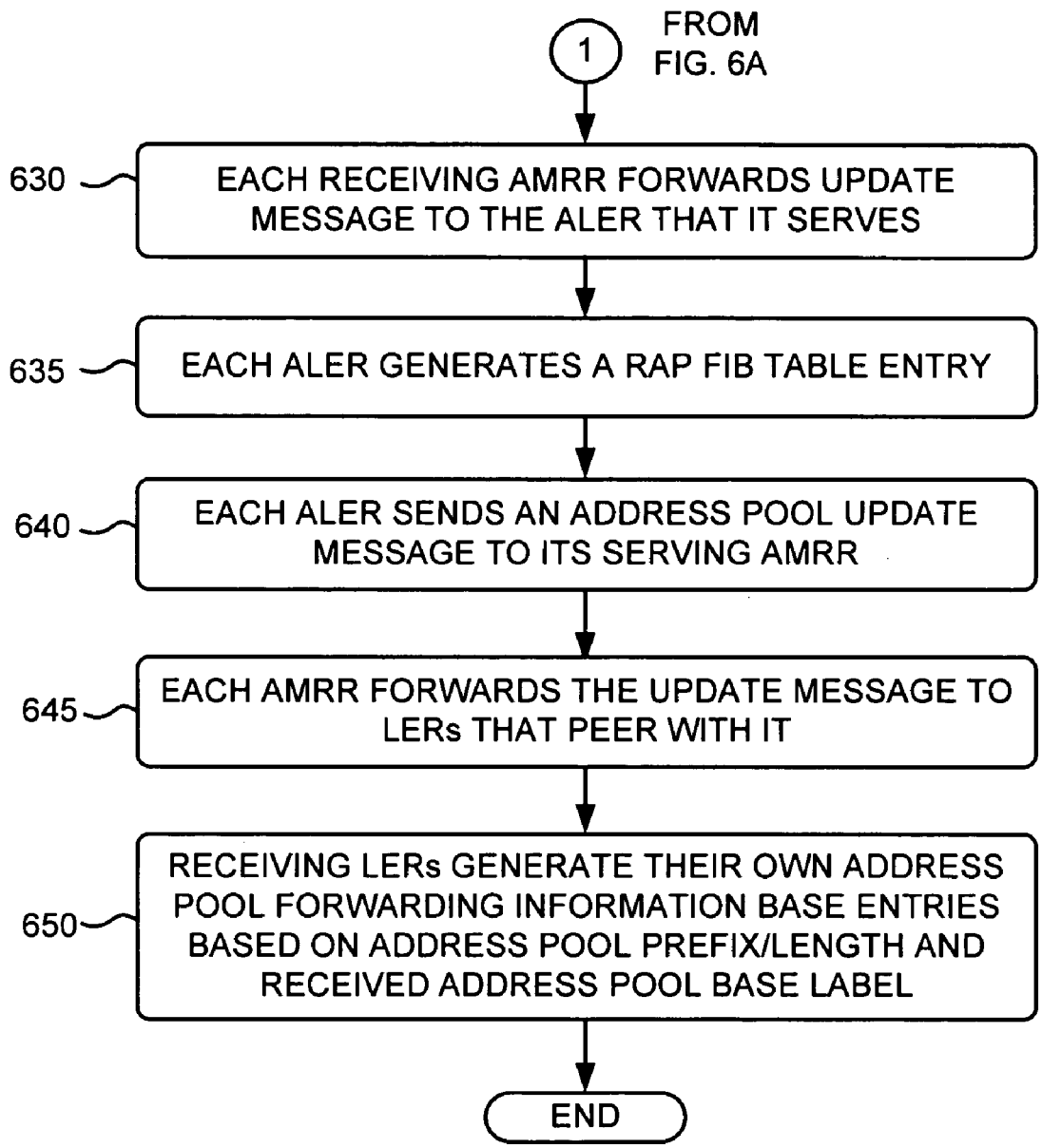

An address pool update may be sent to the AMRR serving the LER (block 550). LER 130/140/150 may begin the address pool distribution process by advertising its RAP to the serving AMRR via sending an address pool update message that includes the RAP Prefix/Length information and the associated RBL. FIGS. 6A and 6B below describe further details of the address pool distribution process.

FIGS. 6A and 6B are flow diagrams that illustrate an exemplary process for distributing of mobility address pool information to LER and ALER nodes in a mobility label based MPLS network. The exemplary process of FIGS. 6A and 6B may be implemented by one or more AMRRs 180 and ALERs 160 in network 100.

Figure 7:
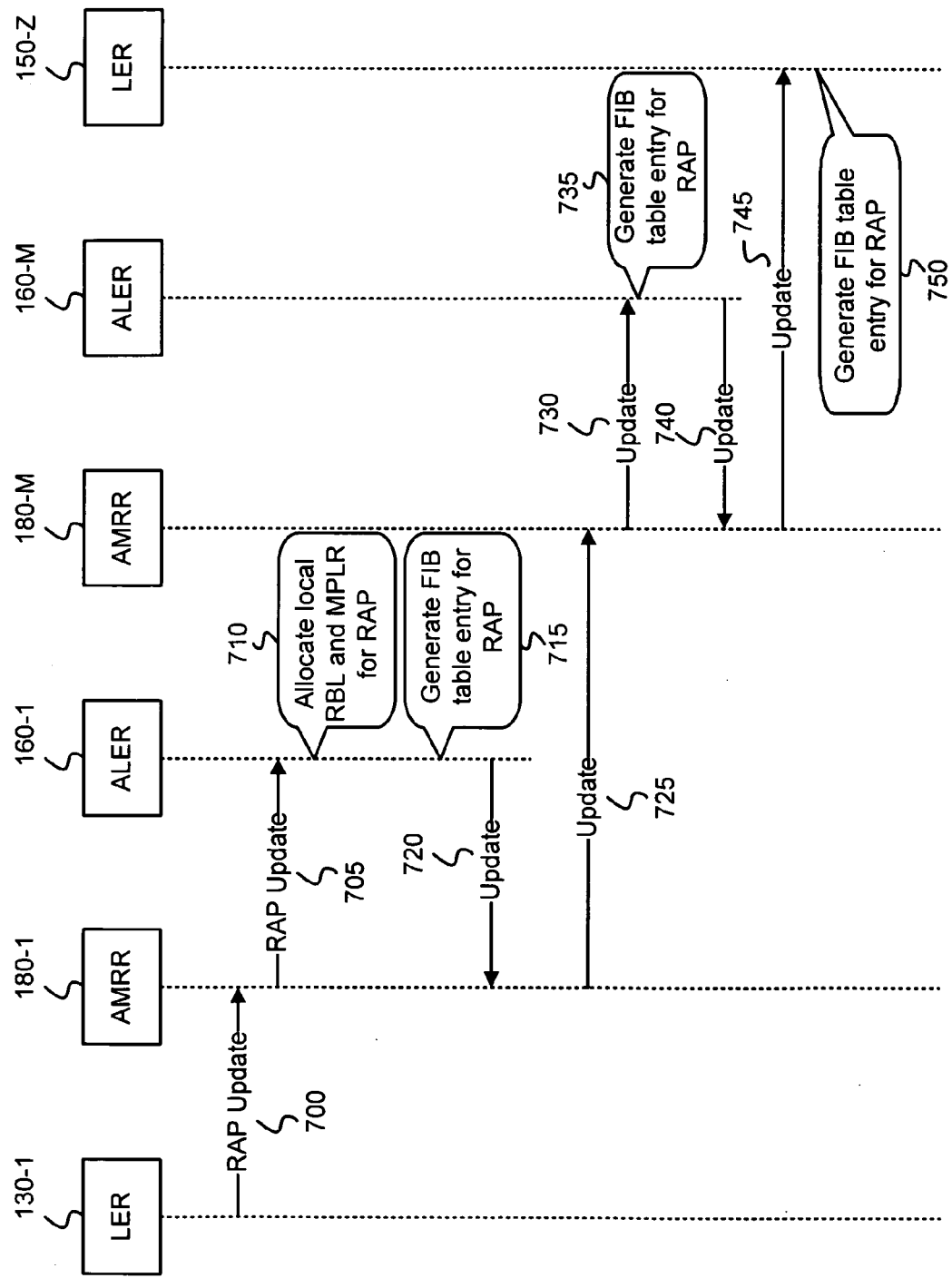
FIG. 7 is a diagram depicting exemplary messaging associated with the exemplary process of FIGS. 6A and 6B.

The exemplary process may begin with an AMRR receiving an address pool update from a LER (block 600). For example, as shown in FIG. 7, AMRR 180-1 may receive a RAP update 700 from LER 130-1 which may advertise LER 130-1's RAP and may include the RAP Prefix/Length information and the associated RBL. The address pool update may include the update sent by a LER in block 550 of FIG. 5.

The AMRR may forward the address pool update to the ALER that serves the LER from which the update was received (block 605). For example, AMRR 180-1 may forward the address pool update to ALER 160-1, which serves LER 130-1. FIG. 7 depicts AMRR 180-1 forwarding an RAP update 705 to ALER 160-1. The ALER may receive the address pool update and may allocate a new local address pool base label and mobility pool label range for the address pool (block 610) and may generate an address pool forwarding information base entry for the received address pool (block 615). For example, as shown in FIG. 7, ALER 160-1 may receive the RAP update from AMRR 180-1, may allocate 710 a new local RBL and a corresponding MPLR, and may generate 715 an entry in FIB 315 for the received RAP update based on the RAP Prefix/Length and RBL contained in the address pool update.

The ALER may send an update message to the AMRR (block 620). For example, once ALER 160-1 has allocated a local RBL and a corresponding MPLR for the address pool, as shown in FIG. 7, ALER 160-1 may return an update message 720 to AMRR 180-1 that includes the RAP prefix/length, the local RBL, and the ALER's router identifier (ID). The AMRR may forward the ALER update message to other AMRRs in the mobility label MPLS network (block 625). For example, as shown in FIG. 7, AMRR 180-1 may forward the ALER's update message 725 to AMRR 180-M (or any of AMRR's 180-1 through 180-M). Each receiving AMRR may forward the update message to the ALER that it serves (block 630). For example, as shown in FIG. 7, AMRR 180-M may forward the received update message 730 to ALER 160-M. Each ALER, upon receipt of the update message, may generate a RAP FIB table entry (block 635). For example, upon receipt of the update message from AMRR 180-M, ALER 160-M may generate a new entry 330 in FIB table 315 using the RBL value and the RAP Prefix/Length contained in the update message.

Each ALER may send an address pool update message to its serving AMRR (block 640). For example, as shown in FIG. 7, ALER 160-M may send its updated RAP information to AMRR 180-M via an update message 740. Each AMRR may forward the update message to LERs that peer with it (block 645). For example, as shown in FIG. 7, upon receipt of the updated RAP information from ALER 160-M, AMRR 180-M may forward the updated RAP information to LERs 150-1 through 150-Z via an update message 745 (only LER 150-Z is shown in FIG. 7 by way of example).

Receiving LERs may generate their own address pool forwarding information base entries based on the address pool prefix/length and the received address base label from the update message (block 650). For example, as shown in FIG. 7, LERs 150-1 through 150-Z may retrieve the RAP prefix/length and RBL from the received address pool update message and may generate 750 a corresponding entry 330 in FIB table 315.

Figure 8:
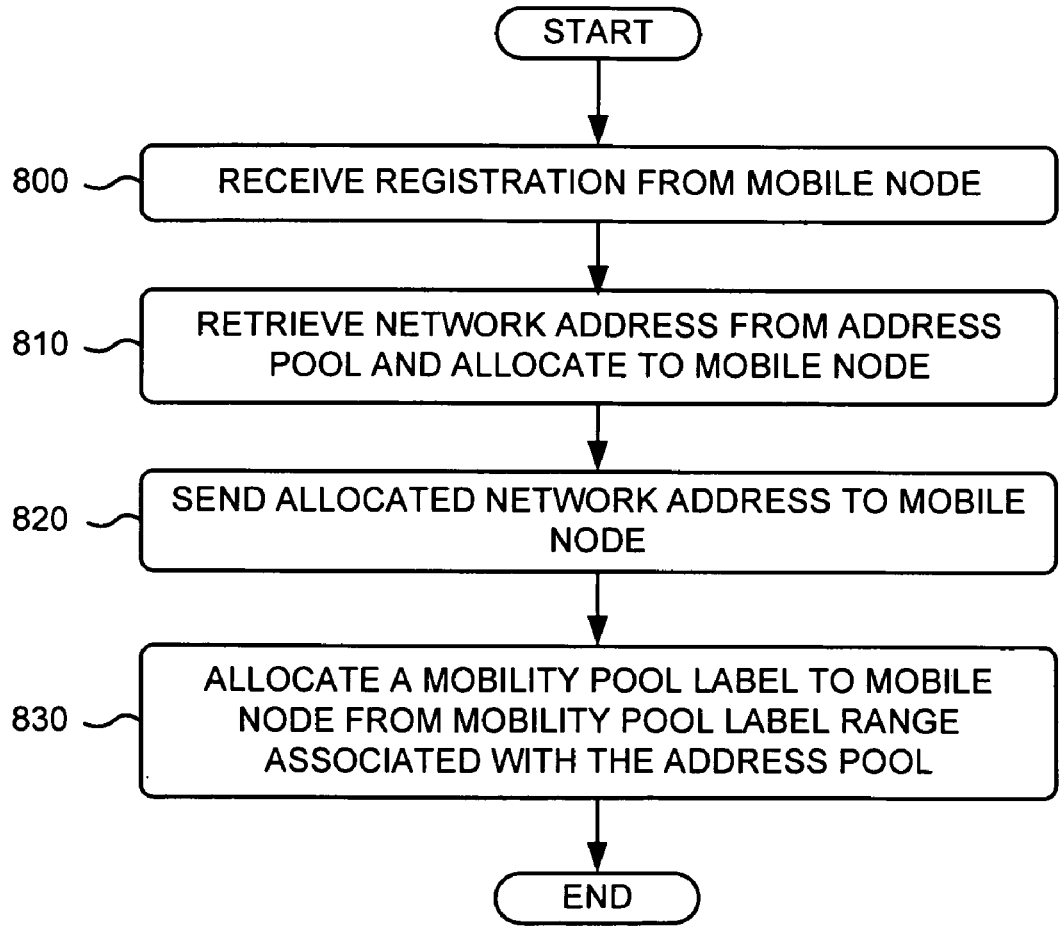
FIG. 8 is a flow diagram that illustrates an exemplary process for registering a mobile node in a mobility label based MPLS network that uses mobility address pools.

FIG. 8 is a flow diagram that illustrates an exemplary process for registering a new mobile node in a mobility label based MPLS network that uses mobility address pools. The exemplary process of FIG. 8 may be implemented by LER 130/140/150.

The exemplary process may begin with the receipt of a registration from a mobile node (block 800). The mobile node (e.g., mobile node 120) may be turned on in one of the Radio Access Network (RAN) cells in a mobility region (e.g., a mobility region within mobility area 110-1) of network 100. After being turned on, the mobile node may initiate a registration with LER 130/140/150.

A network address may be retrieved from the address pool and allocated to the mobile node (block 810). LER 130/140/150 may retrieve an individual network address from the RAP and allocate the network address to the registering mobile node. The allocated network address may be sent to the registering mobile node (block 820). For example, LER 130/140/150 may send an allocated IP address from the RAP to the mobile node for use in future communications. A mobility pool label may be allocated to the mobile node from the mobility pool label range associated with the address pool (block 830). LER 130/140/150 may determine the RO for the allocated individual network address and may retrieve the RBL for the RAP. To allocate a MBL for the mobile node from the MPLR, LER 130/14/150 may use the RO and the RBL to calculate the MPL. The MBL may be used for future MPLS tunneling with the registered mobile node.

Figure 9A:
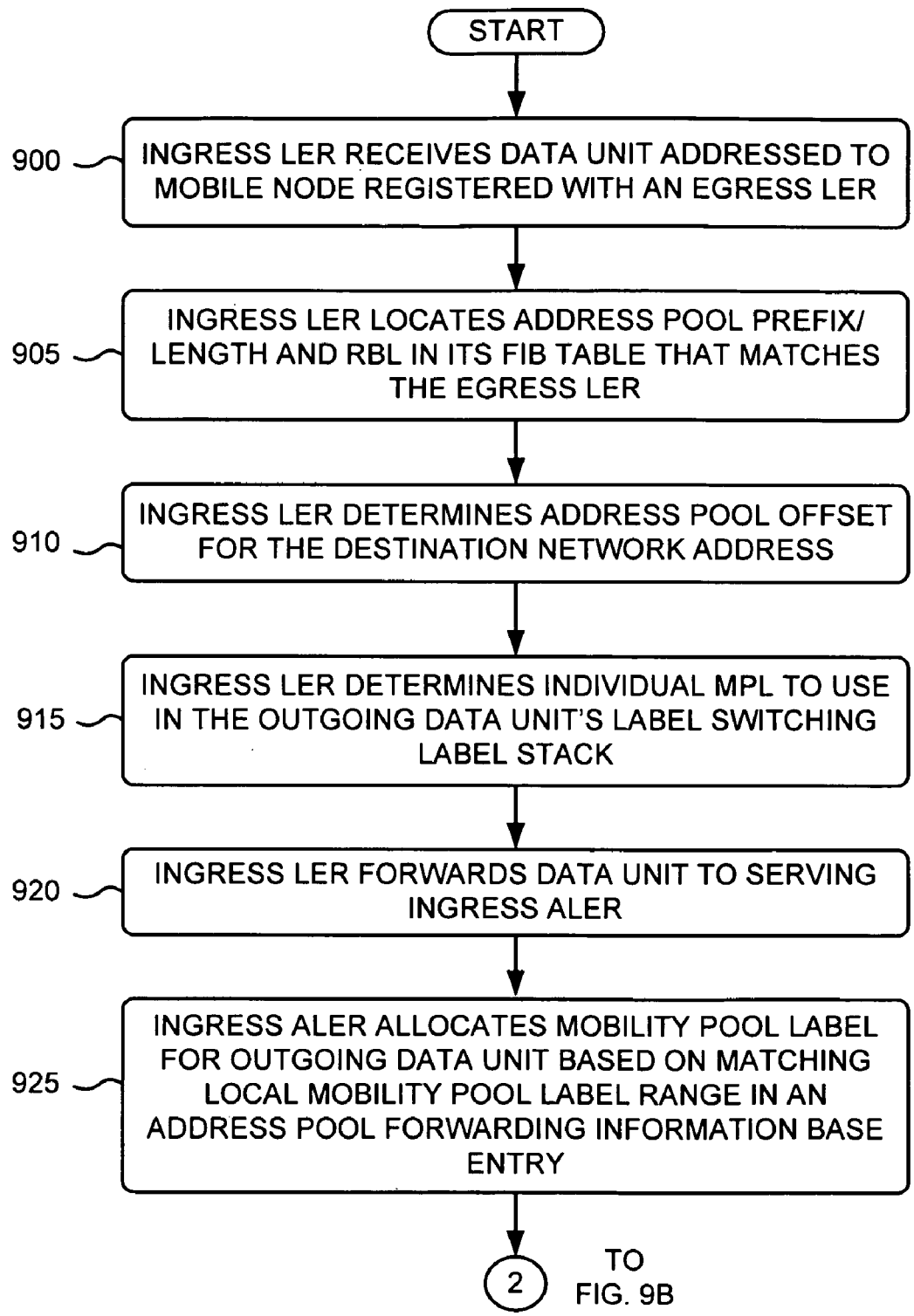
FIGS. 9A and 9B are flow diagrams that illustrate an exemplary process for forwarding data units to destination mobile nodes in a mobility label based MPLS network.
Figure 9B:
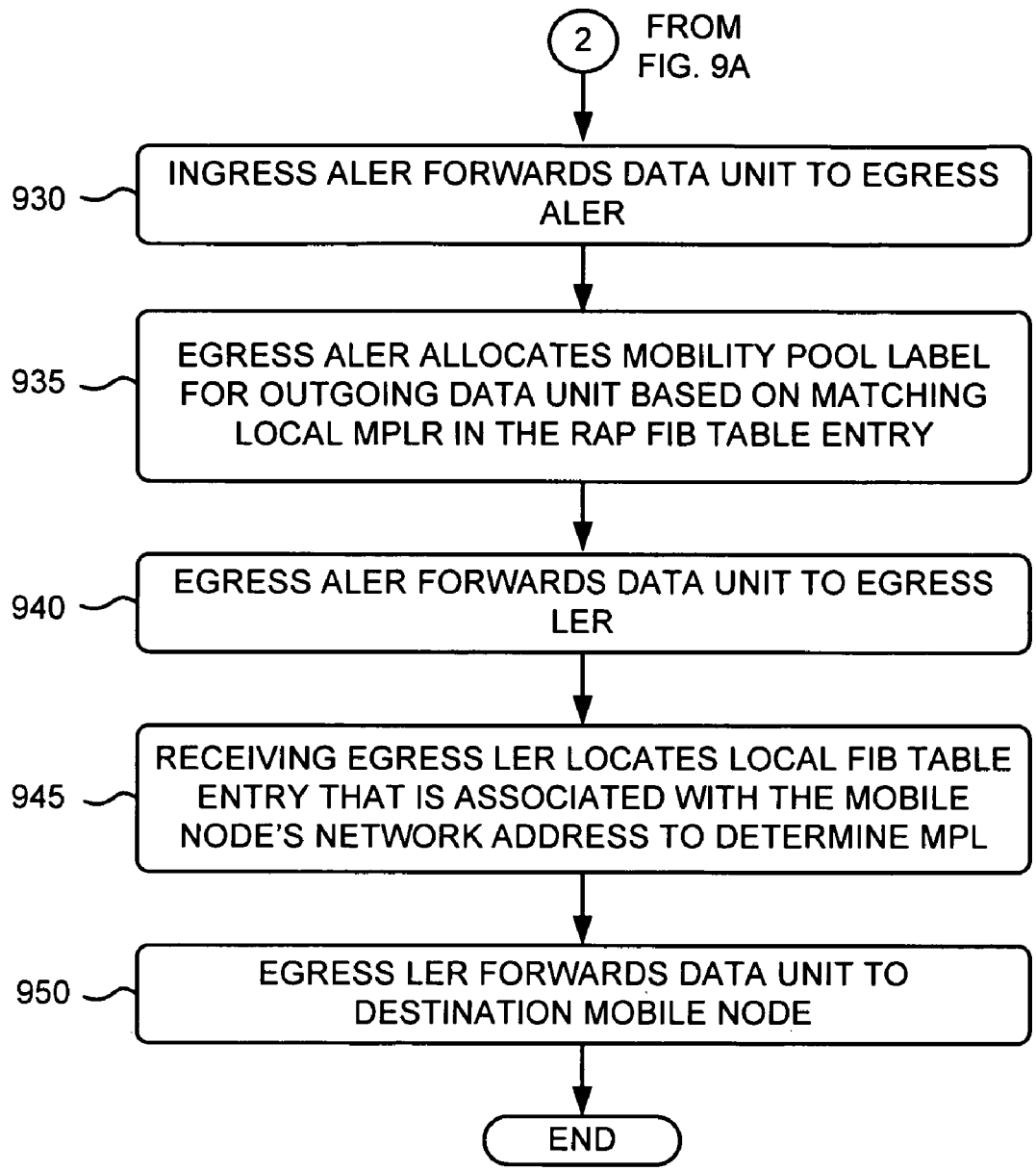

FIGS. 9A and 9B are flow diagrams that illustrate an exemplary process for forwarding data units to destination mobile nodes in a mobility label based MPLS network. The exemplary process of FIGS. 9A and 9B may be implemented by an "ingress" LER in conjunction with an "egress" LER. An "ingress" LER includes a LER that receives an incoming data unit addressed to a mobile node registered with another LER. The other node to which the mobile node is currently registered, and which ultimately forwards the data unit to the mobile node in the mobility area, is the "egress" LER in network 100.

The exemplary process may begin with the ingress LER receiving a data unit addressed to a mobile node registered with an egress LER (block 900). The ingress LER may retrieve the destination network address from the data unit to identify the mobile node and the egress LER to which the mobile node is registered. For example, as illustrates in FIG. 10, LER 130-X may receive a data unit 1000 addressed to mobile node 120, in mobility area 110-M, that is currently registered with LER 150-Z.

Figure 10:
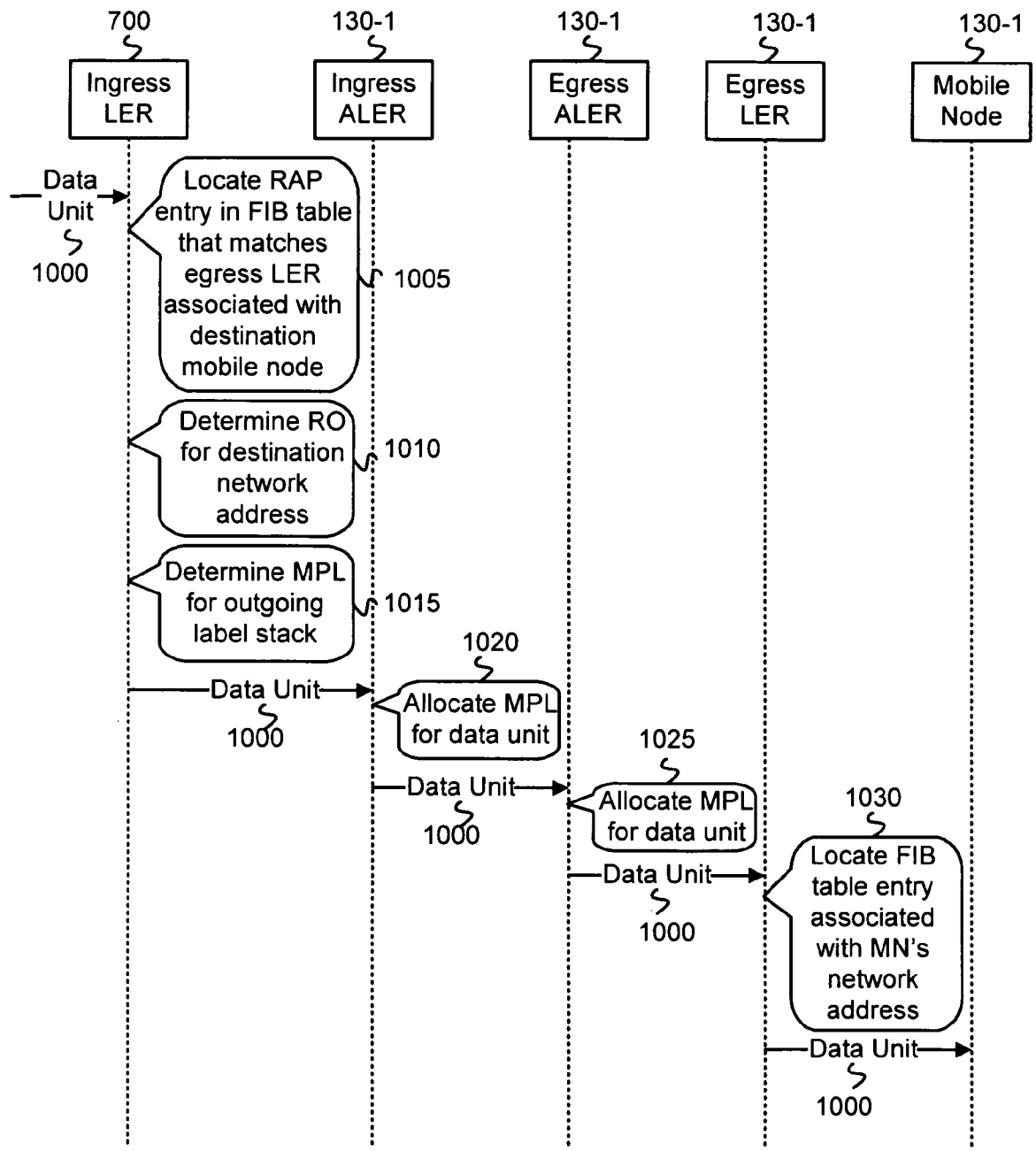
FIG. 10 is a diagram depicting exemplary messaging associated with the exemplary process of FIG. 10.

The ingress LER may locate an address pool prefix/length and RBL in its forwarding information base table that matches the egress LER (block 905). For example, LER 130-x may locate 1005 the RAP entry in FIB table 315 that matches the egress LER associated with the destination mobile node. The LER may then retrieve the RAP information, including the RAP Prefix/Length and RBL for LER 150-Z from its FIB table 315. The ingress LER may determine an address pool offset for the destination network address (block 910). The ingress LER may compute the value of the RO for the destination IP address using a logical operation (e.g., a XOR operation) on the RAP's prefix and the destination IP address values. For example, LER 130-X may perform an XOR operation on the RAP prefix retrieved from its FIB table and the IP address associated with the destination mobile node to compute the value of the RO. FIG. 10 depicts LER 130-X determining 1010 the RO for the destination network address.

The ingress LER may determine the individual mobility pool label to use in the outgoing MPLS data unit's label stack (block 915). The MPL may be determined based on the RBL for the egress LER's RAP and the RO for the destination IP address. For example, if the RO equals 10, and the RBL equals 10, then the MPL would equal 10+10=20. The ingress LER may forward the data unit to the serving ingress ALER (block 920). The ingress LER may use the determined MPL in the MPLS label stack of the outgoing forwarded data unit. FIG. 10 depicts LER 130-X determining 1015 the MPL for the outgoing label stack, and data unit 1000 being forwarded to ALER 160-1.

Upon receipt of the outgoing data unit, the ingress ALER may allocate a mobility pool label for the outgoing data unit based on matching a local mobility pool label range in an address pool FIB table entry (block 925) and the ingress ALER may forward the data unit to the egress ALER (block 930). The ingress ALER (e.g., ALER 160-1) may retrieve the matching MPLR in its FIB table 315 to allocate the MPL for the outgoing data unit and may then forward the data unit using the allocated MPL. FIG. 10 depicts ALER 160-1 allocating 1020 the MPL for the data unit, and data unit 1000 being forwarded to egress ALER 160-M.

The egress ALER may allocate a mobility pool label for the outgoing data unit based on the matching local mobility pool label range in an entry of the address pool FIB table (block 935) and may forward the data unit to the egress LER (block 940). The egress ALER (e.g., ALER 160-M) may retrieve the matching MPLR from its FIB table 315 to allocate the MPL for the outgoing data unit and may then forward the data unit using the allocated MPL to the egress LER (e.g., LER 150-Z). FIG. 10 depicts ALER 100-M allocating 1025 the MPL for the data unit, and data unit 1000 being forwarded to LER 150-Z.

The receiving egress LER may locate the local FIB entry that is associated with the mobile node's network address to determine the MPL (block 945) and may then forward the data unit to the destination mobile node (block 950). The entry in FIB table 315 has previously been created at the time the mobile node registered with the egress LER (FIG. 8 above) and the MPL for the mobile node has previously been assigned from the MPLR associated with the RAP from which the IP address for the mobile node was allocated. The egress LER (e.g., LER 150-Z) may determine the MPL from the local FIB table and use the MPL for forwarding the outgoing data unit to the destination mobile node. FIG. 10 depicts LER 150-Z locating 1303 an FIB table entry associated with the mobile node's network address, and data unit 1000 being forwarded to mobile node 120.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 5, 6A, 6B, 8, 9A and 9B, the order of the blocks may be modified in other embodiments. Further, non-dependent blocks may be performed in parallel. Implementations have been described herein in the context of MPLS, however, any type of label switching protocol may alternatively be used.

It will be apparent that aspects described herein may be implemented in many different forms of software, firmware, and hardware in the implementations illustrated in the figures. The actual software code or specialized control hardware used to implement embodiments is not limiting of the invention. Thus, the operation and behavior of these aspects were described without reference to the specific software code, it being understood that software and control hardware may be designed to implement these aspects based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   receiving, at a label edge router (LER), a pool of network addresses allocated to a mobility region in a mobility label based label switching network;
   allocating, at the LER, a range of mobility labels to the pool of network addresses, each network address, in the pool of network addresses, to be assigned to mobile nodes registered in the mobility region;
   determining, at the LER, a format associated with the range of mobility labels based on the pool of network addresses;
   determining, at the LER, a base label based on the format and the range of mobility labels;
   associating, at the LER, a first offset to a first network address, in the pool of network addresses, based on the base label and a position of the first network address within the pool of network addresses;
   associating, at the LER, a second offset to a second network address, in the pool of network addresses, based on the base label and a position of the second network address within the pool of network addresses, the second offset being different than the first offset and the second network address being different from the first network address;
   determining, at the LER, a first mobility label, of the range of mobility labels, for the first network address based on the first offset and a second mobility label, of the range of mobility labels, for the second network address based on the second offset, the second mobility label being different from the first mobility label; and
   distributing, by the LER, information associated with the pool of network addresses to other nodes in the mobility label based label switching network.

2. The method of claim 1, where the mobility label based label switching network comprises a multi-protocol label switching (MPLS) network.

3. The method of claim 1, where distributing information associated with the pool of network addresses to the other nodes in the mobility label based label switching network includes:
   transmitting an update message to advertise the pool of network addresses, where the update message identifies the format and the base label.

4. The method of claim 1, where the pool of network addresses comprises a sequence of contiguous network addresses.

5. The method of claim 1, where the format comprises a notation that identifies a starting network address, in the pool of network addresses, and identifies a length associated with the pool of network addresses.

6. The method of claim 1, further comprising:
   receiving, at the LER, a registration from one of the mobile nodes;
   allocating, in response to receiving the registration, the first network address to the one of the mobile nodes;
   transmitting information identifying the first network address to the one of the mobile nodes based on allocating the first network address; and
   allocating, in response to transmitting the information identifying the first network address, the first mobility label to the one of the mobile nodes based on the first offset being associated with the first network address.

7. The method of claim 6, the method further comprising:
   receiving, at the LER, data to be transmitted to the one of the mobile nodes;
   identifying, based on the format and the base label, the first offset;
   determining, based on the first offset, the that the first network address is allocated to the one of the mobile nodes; and
   transmitting the data to the one of the mobile nodes based on determining that the first network address is allocated to the one of the mobile nodes.

8. A routing system coupled to a label switching network, the routing system comprising:
   a network device to:
      receive a pool of network addresses allocated to a mobility region in the label switching network, the pool of network addresses comprising a sequence of contiguous network addresses, allocate a range of mobility labels to the pool of network addresses for use in communicating with mobile nodes in the mobility region, the range of mobility labels including a base label and an end label that define the range of mobility labels, determine, for each network address, of the pool of network addresses, an offset for the network address based on a position of the network address within the pool of network addresses and the base label, an offset of a first network address, of the pool of network addresses, being different from offsets of other network addresses, of the pool of network addresses, associate, based on the determined offsets, a particular mobility label, within the range of mobility labels, with each network address, of the pool of network addresses, and advertise information associated with the range of mobility labels to other network devices of the routing system.

9. The routing system of claim 8, where the label switching network comprises a multi-protocol label switching (MPLS) network.

10. The routing system of claim 8, where the network device comprises a Label Edge Router (LER) in the label switching network.

11. The routing system of claim 8, where, when advertising the information, the network device is to:
distribute information associated with the pool of network addresses to other nodes in the label switching network.

12. The routing system of claim 8, where the prefix includes information that:
identifies the base label, and
identifies a length of the sequence of contiguous network addresses.

13. A method, comprising:
receiving, at an ingress label edge router (LER), data that includes a destination address associated with a mobile node registered with an egress LER in a mobility label based multi-protocol label switching (MPLS) network;
retrieving, at the ingress LER, information associated with a network address pool, that includes the destination address, based on a prefix of the destination address, the network address pool being associated with the egress LER;
determining, at the ingress LER, an offset based on the prefix and a base label included in the information associated with the network address pool;
determining, at the ingress LER, a mobility label based on the offset and the base label, the mobility label identifying the destination address associated with the mobile node; and
forwarding, from the ingress LER, the data towards the mobile node using the mobility label.

14. The method of claim 13, where the network address pool comprises a sequence of contiguous network addresses, the method further comprising:
receiving, at the LER, the network address pool;
allocating, at the LER, a range of mobility labels to the network address pool, where the base label comprises a first mobility label in the range of mobility labels.

15. The method of claim 13, where the network address pool is identified with a notation that:
identifies a first network address in the sequence of contiguous network addresses, where the first network address corresponds to the base label, and
identifies a length of the network address pool, the length of the network address pool corresponding to a quantity of mobility labels included in the range of mobility labels.

16. The method of claim 13,
where determining the offset includes:
performing a logical operation on the destination address and the base label to generate the offset.

17. The method of claim 16, where the logical operation comprises a XOR operation.

18. An ingress router, comprising:
an ingress interface to receive data addressed to a mobile node registered with an egress router in a mobility label based multi-protocol label switching (MPLS) network; and
a processor to:
retrieve, based on the data being addressed to the mobile node, information associated with a network address pool,
the network address pool being associated with the egress router, and
the network address pool being identified with information that:
identifies a starting network address, in a sequence of contiguous network addresses, and
identifies a length of the sequence of contiguous network addresses,
determine, based on the starting network address and a destination address included in the received data, an offset value,
determine, based on the offset value and the starting network address, a mobility label associated with the data, and
forward the data towards the mobile node using the determined mobility pool label.

19. The ingress router of claim 18, where the network address pool comprises the sequence of contiguous network addresses.

20. The ingress router of claim 18, where the ingress interface is further to:
retrieve the network address associated with the mobile node based on an initial mobility label associated with the data,
where the processor, when determining the offset value, is further to:
perform a logical operation on the retrieved network address and the first network address from the network address pool to generate the offset value, and
where, when forwarding the data, the processor is to:
replace the initial mobility label with the determined mobility label.

21. The ingress router of claim 20, where the logical operation comprises a XOR operation.

22. The routing system of claim 8, where the network device is further to:
receive an update message from another network device,
where the update message includes information for identifying a prefix, a length, and a base label, and
where the prefix, the length, and the base label are associated with another address pool associated with the other network device,
generate, based on the prefix, the length, and the base label, an entry in a table stored in a memory of the network device,
generate, in response to receiving data to be transmitted to the other network device, a mobility label based on the entry,
modify the data to include the mobility label, and
transmit the modified data towards the other network device.

* * * * *